United States Patent [19]

Schuyler

[11] 4,455,452

[45] Jun. 19, 1984

[54] TOUCH ACTIVATED CONTROLLER FOR GENERATING X-Y OUTPUT INFORMATION

[75] Inventor: David L. Schuyler, Fremont, Calif.

[73] Assignee: Touch Activated Switch Arrays, Inc., Santa Clara, Calif.

[21] Appl. No.: 417,540

[22] Filed: Sep. 13, 1982

[51] Int. Cl.³ ............................................. G08C 21/00
[52] U.S. Cl. ...................................... 178/18; 340/706
[58] Field of Search .......................... 178/18, 19, 20; 340/706

[56] References Cited

U.S. PATENT DOCUMENTS 4,221,975 9/1980 Ledniczki et al. ................. 307/116

Primary Examiner—Stafford D. Schreyer
Attorney, Agent, or Firm—Flehr, Hohbach, Test, Albritton & Herbert

[57] ABSTRACT

A touch activated control unit and system provides control information representative of, and in response to, movement of a person's finger along each of two axes defined on the unit. The control system includes a touch pad as part of the control unit. Elements of the touch pad define a plurality of axes and are responsive to the proximate presence of a person's finger to provide an input in response to touching and representative of the location of the finger on each of the two axes. In this manner a touch activated controller for generating X-Y output information includes touchable traces carried on a common side of a PC board and extending in mutually normal directions. A speed scaling circuit provides improved resolution.

6 Claims, 12 Drawing Figures

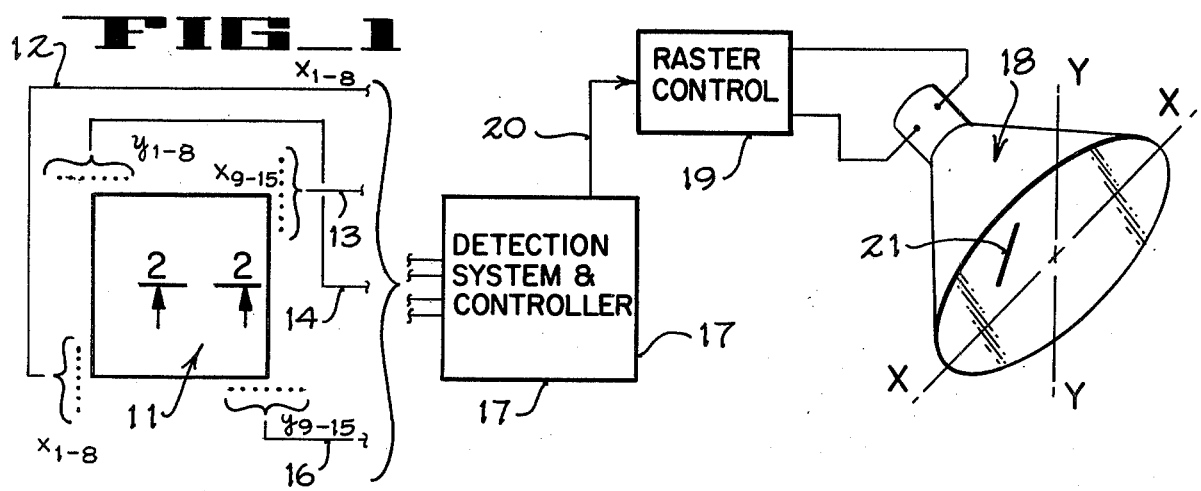
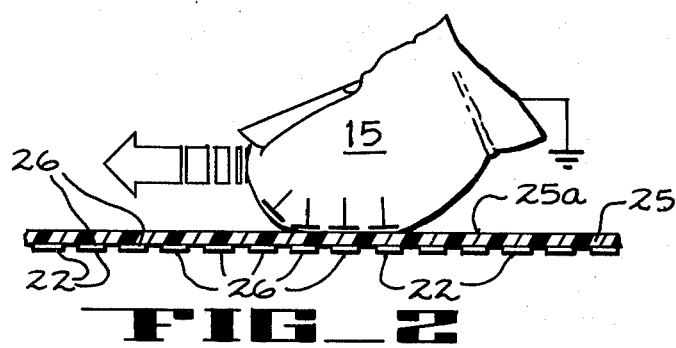
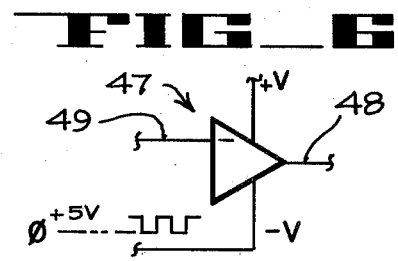
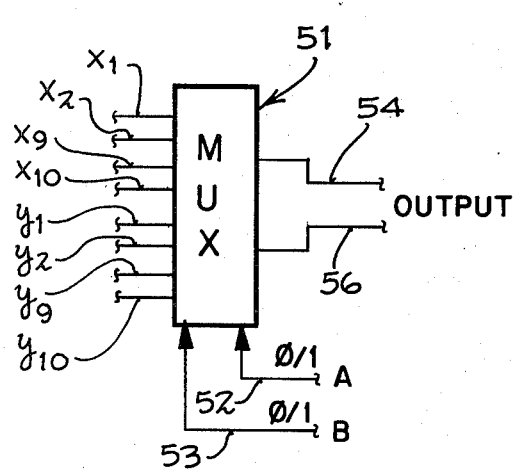
| A | B | from MUX |
|---|---|---|
| 0 | 0 | $X_1$ ; $X_2$ |
| 0 | 1 | $X_9$ ; $X_{10}$ |
| 1 | 0 | $Y_1$ ; $Y_2$ |
| 1 | 1 | $Y_9$ ; $Y_{10}$ |
FIG_8
| SENSE LINES/SEC. | FACTOR |
|---|---|
| 0 – 5 | 0.25 |
| 6 – 8 | 1.0 |
| 9 – 12 | 2.0 |
| 13 – | 4.0 |
FIG_9

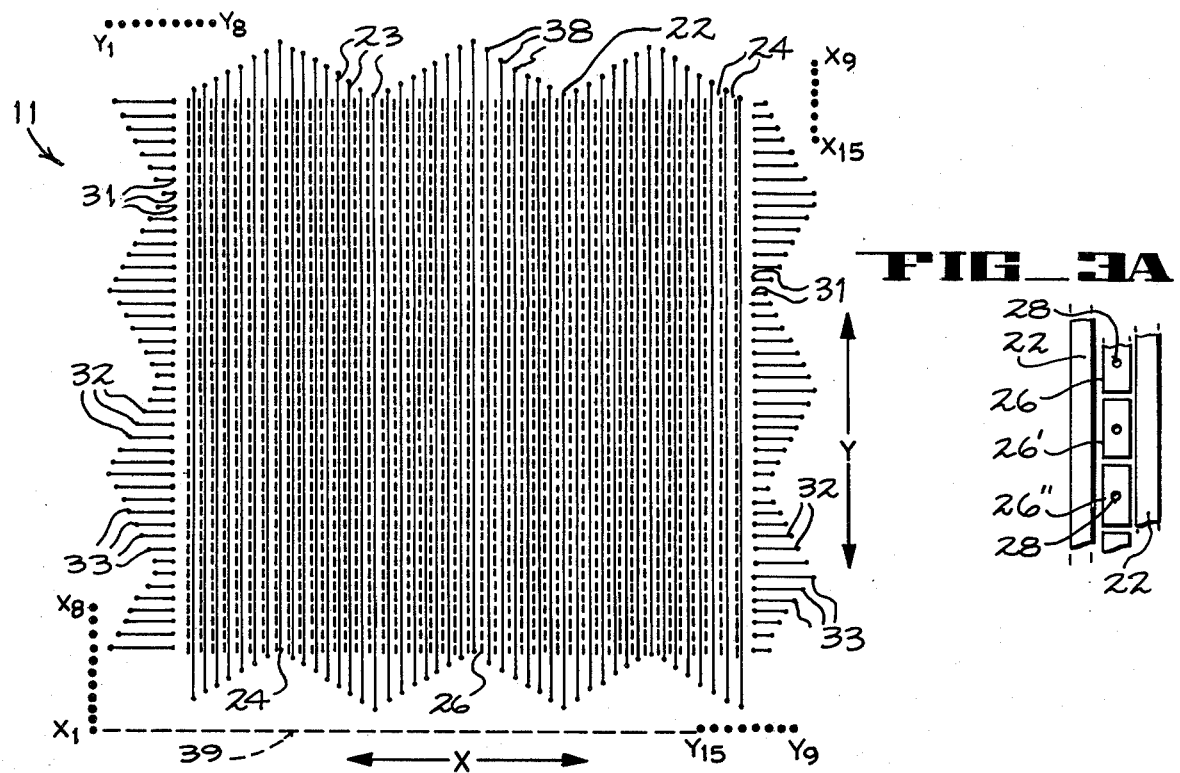
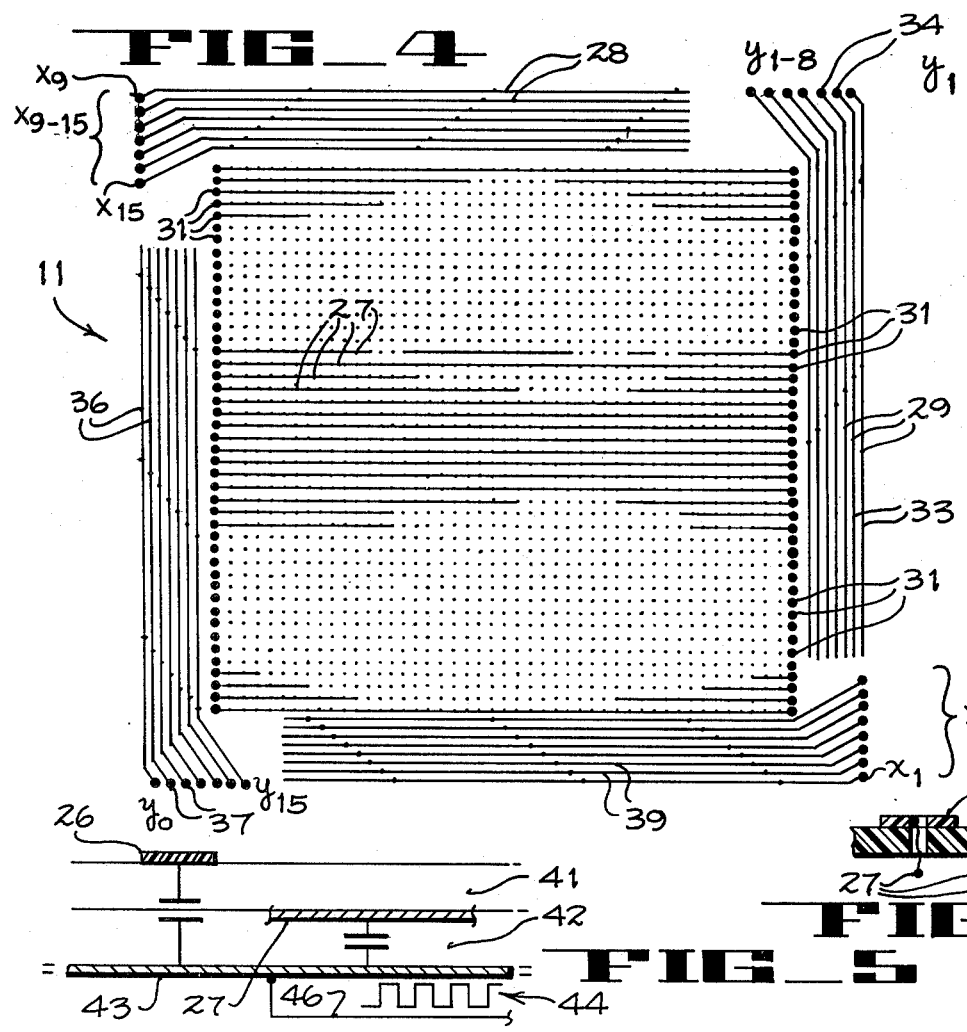

TOUCH ACTIVATED CONTROLLER FOR GENERATING X-Y OUTPUT INFORMATION

This invention pertains to a touch activated controller unit and system for providing control information representative of and in response to movement of a person's finger along each of two axes defined on the unit. Preferably the control information which is generated serves to control apparatus in response thereto in a manner representative of the finger movement.

The invention is particularly useful, for example, in providing a trace on a video display in response to defining a related trace on the control unit by means of a person's finger. As disclosed, the two axes are normal to one another to provide control information for both the X and Y axes.

While touch activated controllers have previously been known of a type in which the movement of a person's finger is limited to a single axis as shown in U.S. Letters Pat. No. 4,221,975, a need has existed to provide a touch activated controller for generating control signals in response to finger movement along a plurality of axes.

However, the lack of fine resolution of control signals derived directly from the use of a person's finger on a touch activated control unit has previously been observed to be a limiting characteristic of such units.

In general, there has been disclosed a touch activated control unit and system providing control information representative of and in response to movement of a person's finger along each of two axes defined on the unit. The control system includes a touch pad as part of the control unit and means responsive to the proximate presence of a person's finger or other suitable body part with respect to elements of said touch pad defining a plurality of axes to provide an input in response thereto representative of the location of the finger on each of the two axes.

In general it is an object of this invention to provide a touch activated control unit and system to supply information representative of the movement of a person's finger along a plurality of axes.

Another object of the invention is to provide such a touch activated control unit constructed and arranged to have a minimum crosstalk between a first series of elements when touched and a second series of elements.

The foregoing and other objects of the invention will become more readily evident from the following detailed description of a preferred embodiment when considered in conjunction with the drawings.

FIG. 1 shows a diagrammatic representation of a touch activated control system as employed to control a trace on a video display in response to movement of a person's finger on a touch pad;

FIG. 2 shows a diagrammatic representation of a side elevation section view of a portion of the surface of the touch pad shown in FIG. 1 and taken along the line 2—2 of FIG. 1;

Figure 10:
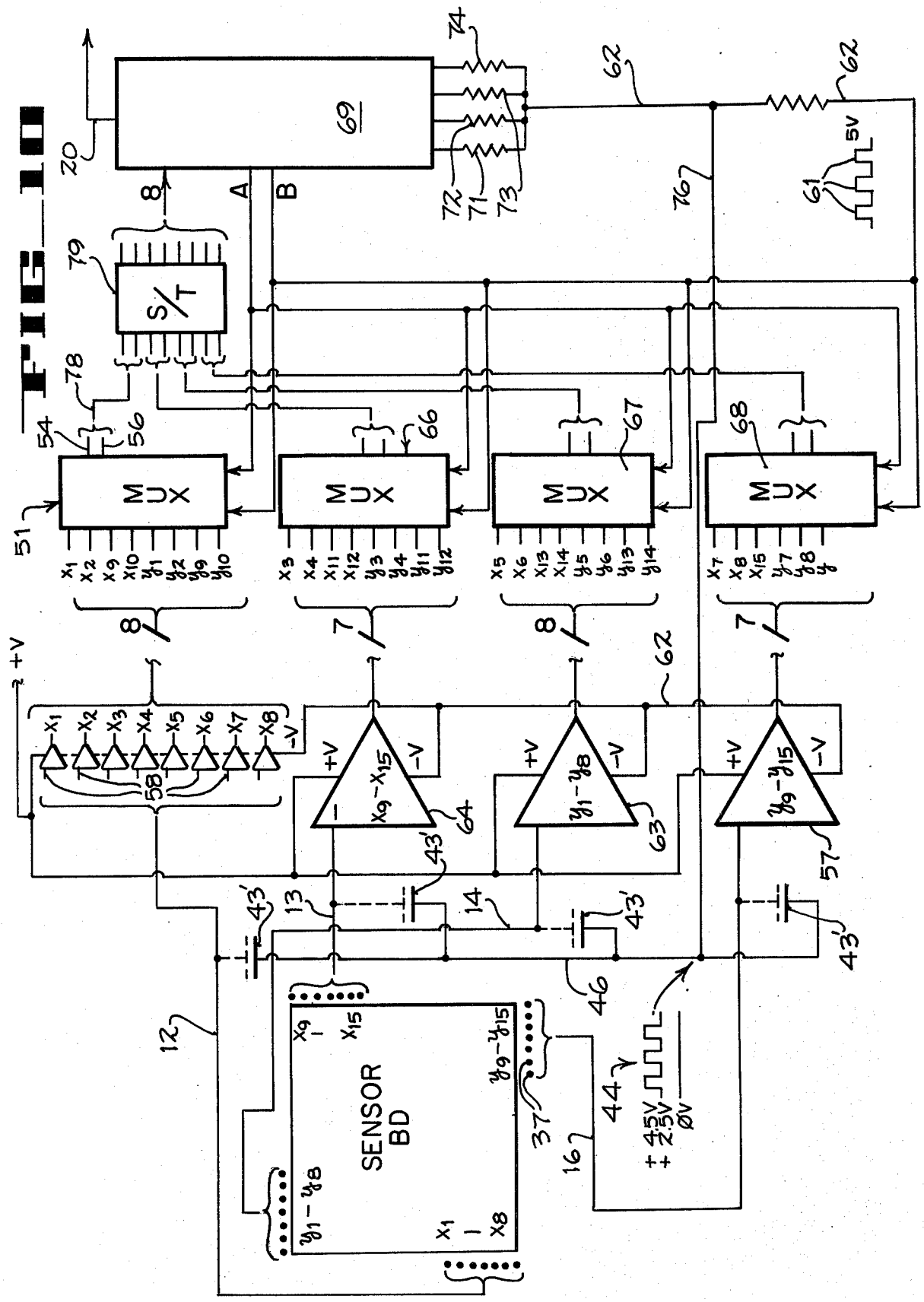

FIGS. 3 and 4, respectively, show diagrammatic views of the top and bottom of a sensor board as shown in FIG. 1;

FIGS. 3A and 4A respectively show an enlarged plan and elevation view of a portion of FIGS. 3 and 4, FIG. 4A being in section;

FIG. 5 shows a diagrammatic elevation section view of an X and a Y sensing element;

FIG. 6 shows a diagrammatic view of an operational amplifier for purposes of explanation of the operational amplifier employed in the system shown in FIG. 10;

FIG. 7 shows a diagrammatic view of a multiplexing unit for gating various pairs of inputs to outputs thereof;

FIG. 8 shows a chart for purposes of explanation of the operation of the multiplexing unit of FIG. 7;

FIG. 9 shows a chart for purposes of explanation of the feature described herein of speed scaling; and FIG. 10 shows a diagrammatic system arrangement according to the invention.

While the invention as disclosed herein has a utility in various applications, for purposes of explanation herein the application shown in FIG. 1 will be described in detail. In addition, while the application of the invention herein pertains to the use of the movement of person's finger to define a given trace on a sensing board 11 it will also be readily evident that other suitable body parts such as a person's knuckle or the like can be used to effect comparable results.

As described further below with respect to FIGS. 3, 4 and 5, sensing board 11 is arranged to provide a sequence of output signals along both an X and a Y axis and as arranged a total of fifteen output signals are derived from movement along each of the X and Y axes. Lead 12 represents a composite of eight individual leads whereby eight X outputs appear. Similarly, the remaining seven X outputs appear on composite lead 13. Likewise eight Y outputs are taken from eight leads shown as a single composite lead 14 while the remaining seven Y outputs are sensed via the seven Y output leads shown as a single composite lead 16. System 17 coupled by leads 12, 13, 14, 16 to sensing board 11 serves to provide control information representative of, and in response to, movement of a person's finger along each of the X and Y axes on sensor board 11 for controlling appropriate apparatus. One such appropriate apparatus includes a video display 18 as shown in FIG. 1.

The control information generated by system 17 can, for example, be coupled to a raster control unit 19 for operating video display 18 to reproduce a trace 21.

The top and bottom of sensor board 11 have been shown respectively in FIGS. 3 and 4 now to be described.

Board 11 comprises a supporting layer of insulating material such as printed circuit board material. A first series of elongate conductive elements 22 distributed cyclically across the width of the board in closely spaced relation provide three sequences of fifteen conductors 22 each whereby a person's finger can move across a total of forty-five conductors for sensing movement in the horizontal or X axis direction. Means forming leads coupled to the X axis elements 22 serve to carry signals thereon responsive to movement of a person's finger along the X axis, i.e. from left to right or right to left across the top of sensing board 11.

Between adjacent pairs of traces 22 lie elongate segmented traces 24. The increments 26 of each trace 24 are distributed lengthwise of its associated trace 24. However, each row of increments has been joined by associated conductors 27 (FIG. 4) by providing lead-through openings 28 of minimum size whereby connection can be made to conductors 27. Means for coupling each of conductors 27 to an associated one of common lines 29 includes feedthrough openings 31 which pass upwardly through board 11 to leads 32. The ends of leads 32 include an additional leadthrough connection 33 electrically coupled to an associated one of the common lines 29.

As thus arranged each conductor 27 feeds upwardly to the top of board 11 to provide information on leads 32. It is to be observed that the outer ends of leads 32 include leadthrough connections 33 which provide a connection leading downwardly through the board 11 and connect with common lines 29. Common lines 29, on the bottom of board 11, shown in FIG. 4, extend to an associated one of eight output pins 34. Similarly, at the left end of lines 27 additional feedthrough openings 31 extend upwardly to the top surface of board 11 to make connection with additional leads 32. The ends of those leads 32, shown on the left hand side of FIG. 3, formed with leadthrough openings 33 make connection with an associated one of several common lines 36 leading to the seven output pins $Y_9$ through $Y_{15}$ and designated by the numeral 37.

Accordingly, leads 29 and 36 carry signals thereon responsive to movement of a person's finger along the incremental elements 26.

Similarly, with reference to the X traces 22 information with respect to the lateral position of a person's finger is taken via the feedthrough openings 38 to associated common lines 39.

As shown in FIG. 3a an enlarged portion of the top surface of sensor board 11 is shown so as to disclose the presence of the feedthrough openings 28 as shown in side elevation view in FIG. 4a for making connection to conductors 27.

From inspection it will be readily evident that the circuit path lengths for all of the X lines 23 is the same. Similarly, the length of the circuit path for all of the Y lines is the same. It has been observed that by making all of the circuit path lines along each axis the same it is possible to provide a balanced input signal from the various positions located on the sensor board.

Finally, as shown in FIG. 5, sensor board 11 includes a double sided PC board forming a substrate of insulation material 41 and a single sided substrate of PC board material 42 secured together to provide a semi-rigid foundation for the sensor board. Substrate 42 carries a clad 43 of copper material on its bottom surface to serve as a guard plane for reasons explained in detail further below.

As diagrammatically illustrated in FIG. 5 the capacitive coupling between the X traces will be less than for the Y traces since the latter also include the capacitance of the nearby conductors 27, as explained below. In view of the fact that all of the X and Y lines are sampled by the system alternately an alternating bias voltage represented by the square wave 44 is applied to guard plane 43 via lead 46. Accordingly, this bias voltage alternates for the readout of the X and Y traces, the X traces being read out when the bias voltage is greater. Thus, a balanced coupling for both coordinates X and Y can be achieved as explained in greater detail further below.

Input signals applied to each X axis trace 22 and to the increments 26 (which make up Y axis traces 24) are derived by grounding the slight capacitive coupling defined between a person's finger 15 and traces 22 or increments 26, as shown diagrammatically in FIG. 2.

Thus, when an activator, such as a person's finger 15, moves across axis traces 22 and increments 26 of Y axis traces 24, finger 15 completes the formation of a sequence of "capacitors" coupled as inputs to a number of sensing circuits 57, 58, 63, 64. In this way, and as shown in FIG. 2, with a broad area of skin overlaid in uniformly spaced relation to traces 22, 24, portions of the skin area can be considered to constitute the equivalent of plate of "capacitors" while the conductive elements 22, 26 form the other plates (when in the proximate presence of finger 15). Each "capacitor" formed in this manner is coupled to ground via the person's body.

While an equivalent form of contact or other activator can be formed to operate the system herein, the present system will be described with respect to its operation in response to movements of a finger across the surface 25a of a uniform layer 25 having in mind that other types of activator can be used to develop similar inputs.

As arranged, fifteen output leads for the X and Y axis traces 22, 24 are repeated three times and coupled sequentially in common to provide sufficient displacement on sensor board 11 along the X and Y axes as described in the above identified patent.

Sufficient spread must exist between the first and the last trace or sense line in each group so that there is little likelihood that the finger will cover all sense lines simultaneously. With all sense lines of a given group covered it is not possible to determine motion of the finger using the arrangement described further below. Thus, the spread between the first and last sense line within each group thereof is deemed to be a "maximum fingerprint".

Means for detecting the output from sensing board 11 and for generating control signals therefrom are shown in FIG. 10. The system of FIG. 10 includes operational amplifiers 47 as shown in FIG. 6 and multiplexing units as shown in FIG. 7, both as now to be described.

The operational amplifier 47 (when properly biased) provides a digital output signal on line 48 in response to sensing of ground on input lead 49 as provided by the presence of a finger associated with a related trace on sensing board 11. The operational amplifier is biased between the $+V$ and $-V$ voltages. If $+V$ is considered to be substantially five volts, when the $-V$ input rises to substantially five volts (or the equivalent of the $+V$ input) amplifier 47 will be disabled so as to be unable to provide any output on lead 48. However, when the $-V$ input drops to zero then amplifier 47 becomes enabled whereby the sensing of ground on input lead 49 can provide a suitable output on lead 48.

With reference to the multiplexing unit 57 shown in FIG. 7 and in FIG. 10 four pairs of inputs are provided from the X and Y sources. For example, as shown in FIG. 7 the first four inputs are taken from the $X_1$, $X_2$, $X_9$, $X_{10}$ connector pins of sensor board 11. The remaining four inputs are arranged in pairs and receive information sensed from the $Y_1$, $Y_2$, $Y_9$, and $Y_{10}$ connector pins of board 11. Means as described in the system shown in FIG. 10 provides digital gating control signals to the multiplexing unit 51 to gate one of the four pairs of inputs to the single pair of outputs 54, 56.

Accordingly, a digital 0 or a digital 1 will appear on each of the two lines 52, 53 (referred to hereinafter as the A and B gating lines) to operate unit 51 in accord with the chart of FIG. 8. When the signals on lines A and B are both 0 the output gated from multiplex unit 51 onto the output leads 54, 56 will be information from the connector pins designated $X_1$, $X_2$. When the A line carries a digital 0 and the B line carries a digital 1 then unit 51 gates the outputs from the next pair of input leads (from $X_9$, $X_{10}$) The information from the Y connector pins is provided in the same way in response to the gating signals shown in FIG. 8.

Multiplexing of the kind described is not believed to be part of the invention as it is believed to be known in the art to provide the foregoing type of gating function.

In the interest of simplifying the drawing shown in FIG. 10 and to eliminate a number of lines making it difficult to understand, multiple lines taken from the X and Y connector pins, such as output pins 37 of FIG. 4, have been represented by a single composite lead 16 for the seven leads which are actually taken from the group of connector pins 37. Each of these seven extends to an associated operational amplifier 57 for transmitting information pertaining to traces $Y_9$ through $Y_{15}$. More specifically, as shown in FIG. 10, with respect to the composite lead 12 coupled to output pins 34 associated with the $X_1$ through $X_8$ traces a bracket has been shown adjacent these eight leads which then are represented by composite lead 12. Lead 12 can therefore, be respectively coupled to eight operational amplifiers 58. The outputs of amplifiers 58 are fed variously by their respective output leads (not shown) to the input terminals of various multiplexing units 51, 66–68. As noted above, when the bias applied to the $-V$ terminal of the operational amplifiers is zero then they are enabled whereas when the bias at $-V$ is at substantially $+5$ the operational amplifiers will be disabled.

Accordingly, as shown in FIG. 10, a train of square wave pulses 61 generated on control line 62 serve to alternately enable and disable all operational amplifiers 58 and those of three additional groups of operational amplifiers 57, 63, 64 which are each shown as a composite representation of the appropriate number of individual amplifiers of the group. Subsequently, when control pulses 61 on control line 62 drop to zero volts all operational amplifiers 57, 58, 63, 64 become enabled whereby the presence of a person's finger associated with any of the input leads will be supplied via an associated one of the operational amplifiers to an associated one of the inputs as found among the four multiplex units 51, 66–68.

Accordingly, while amplifier 58 includes eight individual amplifiers for providing output signals representative of sensing the presence of a finger at any one of the eight X traces 22 these outputs, $X_1$ through $X_8$ are connected variously to the multiplex units as indicated at the input side of each multiplex unit. Thus, the outputs of amplifier 58 for an input representative of finger contact with traces associated with $X_1$ and $X_2$ are coupled to multiplex unit 51. The outputs from amplifier 58 representative of finger contact with traces $X_3$ and $X_4$ are coupled to multiplex unit 66. Similarly, the outputs of amplifier 58 for $X_5$ and $X_6$ are coupled to multiplex unit 67 and finally, the outputs from amplifier 58 for $X_7$ and $X_8$ are coupled to multiplex unit 68. In the same manner the outputs from each of the remaining operational amplifiers are coupled to associated inputs of one or another of the various multiplex units.

A microcontroller 69 constructed in accordance with known techniques to provide known functions as listed below controls the readout of the X traces alternately with the readout of the Y traces.

A preliminary function of controller 69 serves to turn "ON" a sequence of clock pulses 61 for enabling and disabling operational amplifiers 57, 58 and 63, 64. An additional function is to switch "ON" an appropriate number of resistors 71, 72, 73, 74 to provide an appropriate bias voltage to guard plane 43 (represented in FIG. 10 by the numbers 43') along the path traced by lead 62 from the output of controller 69, along line 76 to a lead 46 disposed in common to each of the guard plane representations 43'.

As noted in FIG. 10, the guard plane 43 as represented by number 43' forms the bottom plate of a capacitance. The top plates of each have been shown in dotted lines simply to represent a certain amount of capacitive coupling to the sense lines or traces. Thus, it will be readily evident that the amount of capacitive coupling will be greater when the Y traces are being readout than when the X traces are being readout in view of the fact that the Y traces include the capacitance of their connecting lines 27 disposed beneath the top substrate 41 and much closer to guard plane 43 than traces carried on the upper surface of the same substrate 41. Accordingly, an alternating bias to guard plane 43 balances the capacitive coupling for both the X and Y traces inasmuch as the capacitive coupling for the X traces will be less. For example, as shown in FIG. 5, capacitive coupling is shown between increment 26 and guard plane 43 as well as for the proximate conductor 27. The total amount of capacitive coupling is additive so as to provide the greater additional capacitive coupling during readout of the Y traces.

Controller 69 further includes means for sampling the condition of each trace by gating the pairs of signals through each multiplex unit 51, 66–68. Accordingly, the output leads 54, 56 are represented by the composite lead 78 to supply the gated information to one of eight inputs to an Octal Schmidt trigger 79.

As is known, the octal style of Schmidt trigger 79 includes essentially the equivalent of eight Schmidt triggers which are respectively associated with the eight inputs thereto Schmidt triggers 79 provide a stable output to controller 69. In this way information as to the status of X and Y traces is supplied to micro-controller 69 from each of the fifteen X and fifteen Y output pines as a person moves a finger across sensing board 11.

The incoming information is stored by known means, as in a given register within micro-controller 69. Subsequent information is received in another register formed by known manufacturing techniques within micro-controller 69 whereby the information in the two registers is subsequently compared so as to determine incremental motion information between the two successive samplings thereby indicating physical displacement. The velocity of this incremental motion is determined by sampling the traces at a fixed time rate. Thus, by sampling incremental motion at a fixed time rate the controller can determine the velocity or rate of change of displacement of the person's finger passing across the sensor board.

In view of the fact that a given location established by a person's finger applied to a sensor board 11 would have limited resolution when reproduced on a video screen, for example, means as now to be described have been provided for creating relatively high quality resolution as well as for increasing the rate of output information as may control movement of a cursor appearing on the face of a video display 18, for example, controlled by suitable output signals on lead 20 representing one or more specific conductors as may be needed to be coupled to raster control 19.

In general, means serving to increase or decrease the velocity of a video trace or other output manifestation can be increased or decreased as now to be described.

As arbitrarily shown in FIG. 9, a chart indicates that if a person's finger crosses between zero and five sense lines per second the speed at which the person is crossing these lines is multiplied by a factor of 0.25. When a person moves a finger at the rate of six to eight sense lines per second the velocity of finger movement is multiplied by a factor of one. However, if the person moves his finger at a rate of nine to twelve sense lines per second then the output is doubled and if a person moves his finger at the rate of thirteen or more sense lines per second the velocity of movement is multiplied by a factor of four.

Accordingly, suitable storage means in micro-controller 69 contains information representative of the various ranges of rates of incremental motion information. Means are further provided according to known construction for comparing the rate of incremental motion information to the various stored ranges of rates. A given multiplier is also stored in association with each range. Further, means for multiplying the incremental motion information by the multiplier associated with that one of the ranges which includes the sensed rate of incremental motion. Means are further provided for storing or accumulating the product of the last named multiplication whereby, as desired, the stored product can be supplied from micro-controller 69.

Using the foregoing technique, accuracy or resolution of the location of a person's finger can be significantly enhanced by moving the finger relatively slowly across the surface of the traces.

Thus, by known construction micro-controller 69 includes means for carrying out the following functions, the speed of the output information can be controlled in response to varying the speed of movement of the person's finger. The method includes the steps of determining the speed of movement of a person's finger along a given axis, establishing a series of various speed ranges, comparing the first named speed with said ranges, and multiplying said speed by a factor associated with that one of said ranges which includes said speed.

From the foregoing it will be readily evident that there has been provided an improved touch activated controller characterized by means for balancing the capacitive coupling between both X and Y traces and the guard plane so that the capacitive coupling will remain substantially the same when sampling eight the X or the Y traces. In addition, there has been disclosed means for substantially enhancing the resolution of output information with respect to the input information derived from movement of a person's finger across the sensing board.

Further, as disclosed herein the design provides a maximum of sensitivity while inhibiting crosstalk between the X and Y axes. In addition, the circuit paths for all of the X traces are of equal length, as well as all of the Y traces so as to minimize variations in the capacitive coupling among the various traces.

It has been observed that, as shown in the drawings, by making all of the x axis sense lines 22 and their associated leads or conductors 23 of equal length their capacitance will be substantially equal with respect to the guard plane 43 so as to provide substantially uniform capacitive coupling thereto along the X axis. Similarly, the Y axis sense lines formed by rows of increments and their associated conductors 27 are of substantially equal length to also provide substantially uniform capacitive coupling with respect to the guard plane 43.

I claim:

1. In a touch activated controller for generating signals representative of displacement of a person's finger movement thereon along each of two axes and adapted to control apparatus responsive to said generated signals, said controller comprising a supporting layer of insulating material, a first series of elongate conductive sense elements distributed in closely spaced relation across said layer, means forming leads coupled to said elements for carrying signals thereon representative of movement of a person's finger across said elements, a second series of elongate conductive sense elements distributed across said layer and disposed between adjacent pairs of said first series, the elements of said second series being divided into a series of increments distributed lengthwise thereof, and means forming conductors coupled to adjacent increments from pairs of said second series of elements for carrying signals thereon representative of movement of a person's finger along said elements of said second series.

2. In the method of generating X-Y output information from a touch activated controller having a sensor board assembly across which a person can move an activator to be sensed along each of two axes to supply input information, the method serving to modify the resolution of the output information with respect to the movement of the activator, the method including the steps of determining the speed of movement of an activator along a given axis of said sensor board, establishing a series of various speed ranges, associating different factors with respect to each speed range, comparing the first named speed with said ranges, and multiplying said first named speed by the factor associated with that one of said ranges which includes said speed.

3. In the method according to claim 2 in which the activator is a person's finger.

4. In a touch activated controller for generating signals representative of displacement of a person's finger movement thereon along each of two axes and adapted to control apparatus responsive thereto, said controller comprising a supporting substrate of insulating material, a first series of elongate conductive elements distributed in closely spaced relation across one face of said substrate, means forming first conductors coupled to said elements for carrying signals thereon responsive to movement of a person's finger thereacross, a second series of elongate conductive elements distributed across said substrate and disposed to include portions lying between adjacent pairs of said first series and on the same face thereof, and means forming conductors coupled to adjacent portions taken from pairs of said second series of elements for carrying signals thereon responsive to movement of a person's finger along said elements of said second series.

5. In a touch activated controller according to claim 4 comprising means forming a guard plane disposed in parallel spaced relation beneath the reverse face of said substrate, means for biasing said guard plane, the last named conductors being carried between said guard plane and said substrate, means for alternately sampling the capacitive coupling for all of said first series of conductors and all of said second series of conductors, and means for reducing the bias applied to said guard plane for sampling said second series of conductive elements to provide a balanced capacitive coupling as between said first and second series.

6. A touch activated controller according to claim 4 in which each of said elements and their associated first conductors of said first series have substantially the same capacitance with respect to said guard plane and each of said elements and their associated second conductors of said second series have substantially the same capacitance with respect to said guard plane to provide substantially uniform capacitive coupling between the elements and associated conductors along each of two axes.

* * * * *